United States Patent
Mayr

(10) Patent No.: US 7,386,313 B2
(45) Date of Patent: Jun. 10, 2008

(54) METHOD FOR CARRYING OUT A HANDOVER PROCEDURE IN A RADIO COMMUNICATIONS SYSTEM HAVING A NUMBER OF TRANSMITTING/RECEIVING UNITS

(75) Inventor: Bernhard Mayr, Paehl (DE)

(73) Assignee: Siemens Aktiengesellschaft, Munich (DE)

( * ) Notice: Subject to any disclaimer, the term of this patent is extended or adjusted under 35 U.S.C. 154(b) by 694 days.

(21) Appl. No.: 10/084,654

(22) Filed: Feb. 28, 2002

(65) Prior Publication Data

US 2002/0119777 A1    Aug. 29, 2002

(30) Foreign Application Priority Data

Feb. 28, 2001 (DE) ................. 101 09 545
Feb. 28, 2001 (EP) ................. 01104899

(51) Int. Cl.
    *H04Q 7/20* (2006.01)
(52) U.S. Cl. .............. 455/436; 455/437; 455/438; 455/447
(58) Field of Classification Search .......... 455/436, 455/437, 439, 442, 447, 524, 525, 426.1; 370/331, 335, 337, 329
    See application file for complete search history.

(56) References Cited

U.S. PATENT DOCUMENTS 4,765,753 A *  8/1988  Schmidt .................. 370/332
5,542,097 A *  7/1996  Ward et al. ............... 455/437
5,740,535 A *  4/1998  Rune ....................... 455/437
5,978,669 A * 11/1999  Sanmugam ................ 455/410
6,078,813 A    6/2000  Ljung
6,122,512 A *  9/2000  Bodin ...................... 455/440
6,212,385 B1*  4/2001  Thomas et al. ............. 455/447
6,285,874 B1*  9/2001  Magnusson et al. ...... 455/456.1
6,647,262 B1* 11/2003  Demetrescu et al. ........ 455/437

FOREIGN PATENT DOCUMENTS

EP          0544457 A2    6/1993
EP          0848567 A1    6/1998
WO          WO98/15150    4/1998

* cited by examiner

Primary Examiner—Charles N. Appiah
Assistant Examiner—Willie J. Daniel, Jr.
(74) Attorney, Agent, or Firm—Staas & Halsey LLP

(57) ABSTRACT

In order to carry out a handover procedure, in which a radio link between a mobile station and a radio communications system, which is set up via a first transmitting/receiving unit, is switched to a second transmitting/receiving unit, the mobile station sends a handover signaling message to the second transmitting/receiving unit in order to set up a connection to the second transmitting/receiving unit. The handover signaling message contains as the handover procedure identifier a code word, whose value matches a handover code which is reserved for handover procedures in the radio communications system, and on the basis of which further transmitting/receiving units in the radio communications system which receive the handover signaling message identify it as a handover signaling message.

9 Claims, 2 Drawing Sheets

METHOD FOR CARRYING OUT A HANDOVER PROCEDURE IN A RADIO COMMUNICATIONS SYSTEM HAVING A NUMBER OF TRANSMITTING/RECEIVING UNITS

CROSS REFERENCE TO RELATED APPLICATIONS

This application is based on and hereby claims priority to German Application No. 10109545.7 filed on Feb. 28, 2001 and European Application No. 01104899.8 filed on Feb. 28, 2001, the contents of which are hereby incorporated by reference.

BACKGROUND OF THE INVENTION

Radio communications systems are used for transmitting information, voice or data, by electromagnetic waves via a radio interface between a transmitting radio station and a receiving radio station. One example of a radio communications system is the known GSM mobile radio network, whose architecture is described, for example, in B. Walke, "Mobilfunknetze und ihre Protokolle" (Mobile radio networks and their protocols), Volume 1, Teubner Verlag Stuttgart, 1998, pages 139 to 151. In this case, a channel formed by a narrow frequency band and a time slot is provided for transmitting each subscriber signal. Since a subscriber signal in one channel differs in frequency and time from the other subscriber signals, the receiving radio station can detect the data from the subscriber signal. In more recent radio communications systems, such as the UMTS system, the individual subscribers are furthermore distinguished by different spread codes.

A radio communications system, for example a GSM mobile radio network, has a large number of mobile switching centers which are networked to one another and provide access to a landline network. Furthermore, the mobile switching centers are each connected to one or more base station controllers. The base station controller allows a connection to at least one base station, and manages the radio resources of the connected base stations. Such a base station is a transmitting/receiving unit, which can set up a radio link to mobile stations via a radio interface, which is also referred to as an air interface.

A region which is covered by a radio communications system is subdivided into individual radio zones, which are also referred to as cells. A cell is in this case controlled by one of the base stations, via which radio links are set up from mobile stations which are located in this cell. In order to avoid interference with radio links in adjacent cells, each cell is assigned a subset of physical channels which are available in the radio communications system. Directly adjacent cells use different physical channels, via which radio links are set up between a mobile station and the base station. Physical channels are reused only when two cells are at a certain distance from one another.

If a mobile station moves from the region of one cell to another cell, then an automatic handover procedure is carried out during the course of the radio link, so that an active radio link can be maintained even beyond cell boundaries. In the handover procedure, the radio link between the mobile station and the radio communications system, which is set up via a first transmitting/receiving unit, is switched to a second transmitting/receiving unit. The need for such a handover procedure is identified by the radio communications system.

It has been found that handover procedures can lead to overload messages at the operation and maintenance center with regard to the connection between the base station and the base station controller and to use of all the channels which are required to set up new radio links via a base station. The latter situation leads to requests for setting up a new radio link being rejected.

SUMMARY OF THE INVENTION

One aspect of the invention is based on the problem of specifying a method for carrying out a handover procedure in a radio communications system, in which overloading of the radio communications system is avoided.

The method can be used in all radio communications systems which have a cellular structure and in which provision is made for physical channels to be reused. The method can be used in particular in radio communications systems which are set up in a corresponding or similar manner to the GSM Standard.

The method is based on the following ideas: in order to initiate a handover procedure from a first transmitting/receiving unit to a second transmitting/receiving unit, the radio communications system sends to the mobile station a message which, in addition to the command to carry out a handover procedure, contains information about the second transmitting/receiving unit to which the radio link is intended to be switched, and contains a handover procedure identifier. At the same time, the radio communications system transmits the handover procedure identifier to the second transmitting/receiving unit, so that this waits for the handover procedure. The mobile station then sends a handover signaling message, often referred to as a handover access message, to the second transmitting/receiving unit. In many radio communications systems, this handover signaling message is sent via the same physical channel, which is defined, for example, by a frequency band and a base station color code (BCC), as that via which signaling messages for a channel request are also sent when setting up a new radio link between a mobile station and the radio communications system. This is the situation, inter alia, in radio communications systems which are set up in accordance with the GSM Standard.

The format of the handover procedure identifier in a handover signaling message (handover access message) corresponds, in terms of its content, to the format of an identification word in a signaling message for a channel request, since it is an eight bit word in both cases. In the case of a handover signaling message, the word contains a random number between 0 and 255. In the case of a signaling message for a channel request, this eight bit word contains a value to identify the connection (establishment cause) and a random number identifier (random reference), so that the eight bit word has fixed meanings. In this case, only specific values of the eight bit word are provided in a signaling message for a channel request.

If, during a handover procedure, the handover signaling message is received by a transmitting/receiving unit in the radio communications system which is not involved in the handover procedure but has been allocated the same physical channel for example as a broadcast radio channel (broadcast channel BCCH) as the second transmitting/receiving unit, to which the active radio link is intended to be switched, then this other transmitting/receiving unit interprets the handover signaling message as a signaling message for a channel request. It then starts a procedure, which is provided in the radio communications system, for setting up a radio link. First of all, this procedure results in signaling traffic. In radio communications systems in accordance with the GSM Standard, the transmitting/receiving unit requests the base station controller for a channel. Channel activation is carried out, and the channel activation is acknowledged. The channel is then assigned (immediate assignment). If the radio communications system finds that no radio link has been set up via that channel within three seconds, then the channel is released once again.

As the load level on the radio communications system increases and as the size of the cells in the radio communications system decreases, this phenomenon leads to overloading of the connection between a base station and a base station controller and of the radio channels (which are in short supply in any case) which are available for setting up new radio links and which are also referred to as stand alone control channels (SDCCH), as a result of such attempts to set up connections being initiated erroneously by the radio communications system.

In the method for carrying out a handover procedure in a radio communications system with a first transmitting/receiving unit, a second transmitting/receiving unit and further transmitting/receiving units, a radio link between a mobile station and a radio communications system, which is set up via the first transmitting/receiving unit, is switched to the second transmitting/receiving unit. In order to set up a connection to the second transmitting/receiving unit, the mobile station sends to the second transmitting/receiving unit a handover signaling message, which contains as the handover procedure identifier a code word whose value corresponds to a handover code. The handover code is reserved for handover procedures in the radio communications system. The handover signaling messages are sent via a physical channel, via which signaling messages for setting up a new radio link to the radio communications system are also sent. The further transmitting/receiving units in the radio communications system which receive the handover signaling message use the handover code to identify the handover signaling message as a handover signaling message. This avoids the further transmitting/receiving units erroneously identifying the handover signaling message as a signaling message for a channel request, and initiating a procedure for setting up a new radio link, which procedure unnecessarily loads the radio resources in the radio communications system.

One of the further transmitting/receiving units, which receives a signaling message with a code word in the physical channel, checks whether the code word matches the handover code in order to decide whether the received signaling message should or should not be regarded as a handover signaling message. The further transmitting/receiving unit preferably rejects a received signaling message as soon as it is found that the code word matches the handover code. This provides optimum protection for the radio communications system against being overloaded by such signaling messages.

In a radio communications system in accordance with the GSM Standard or some similar Standard, the handover signaling message corresponds to a handover access message.

The handover code may be stored in the transmitting/receiving units. The value of the code word is compared with the handover code in each of the further transmitting/receiving units which receives a signaling message with a code word. If a match is found between the value of the code word and the handover code, the code word is identified as a handover procedure identifier, and the signaling message is thus identified as a handover signaling message.

The handover code preferably comprises a number of values. The value of a code word in a signaling message is in this case compared with the individual values of the handover code. If the value of the code word matches one of the values of the handover code, the code word is identified as a handover procedure identifier, and the signaling message is identified as a handover signaling message. The provision of a number of values for the handover code further improves the robustness of the system.

The value/values of the code word as a handover procedure identifier is/are chosen such that the association is unique. This means that the selected values of the code word are not used for any other purpose in the radio communications system.

If the method is used in a radio communications system in accordance with or similar to the GSM Standard, then the first transmitting/receiving unit, the second transmitting/receiving unit and/or the further transmitting/receiving units may be base stations.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
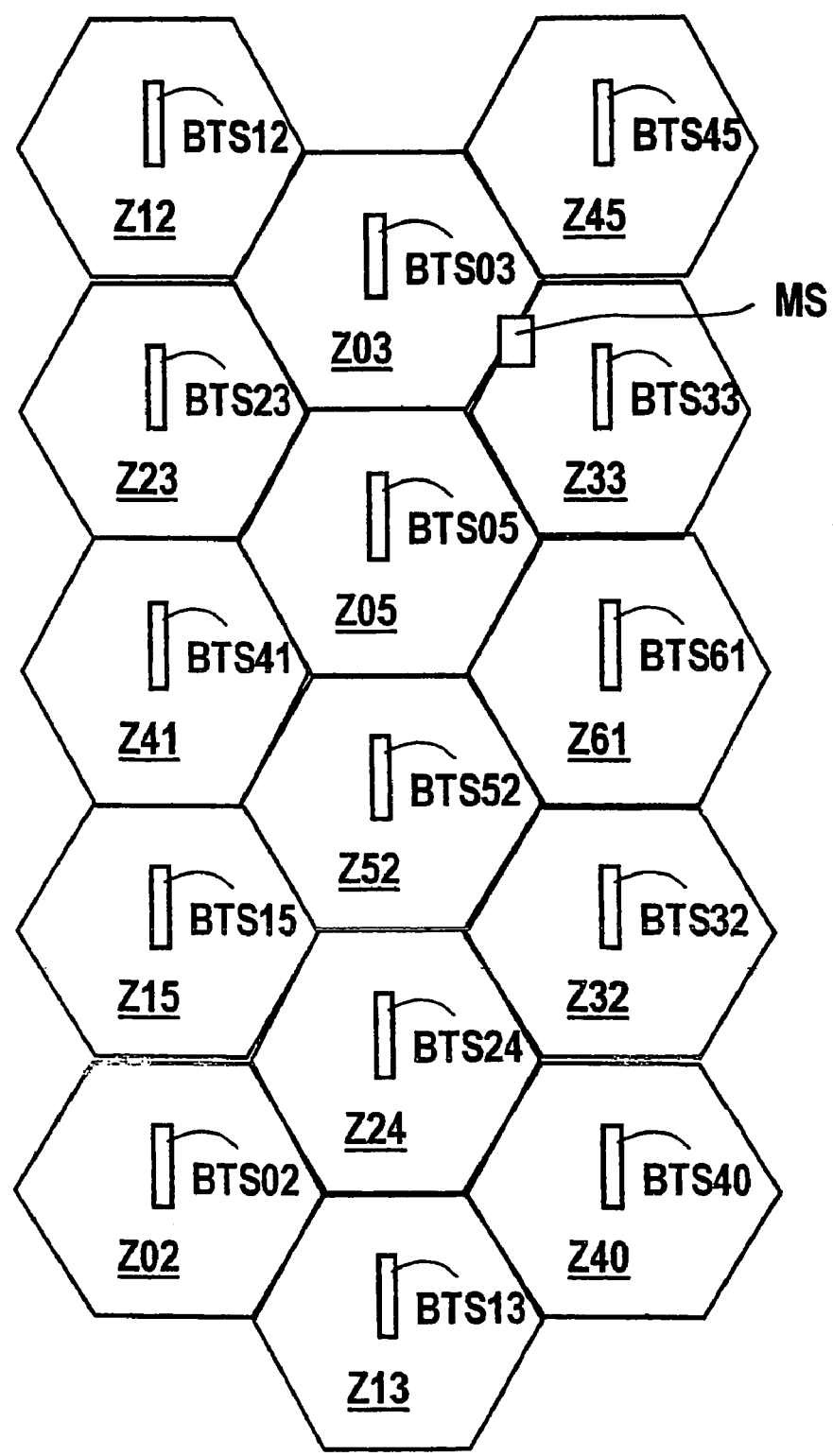
FIG. 1 shows a number of cells in a cellular mobile radio and station.
Figure 2:
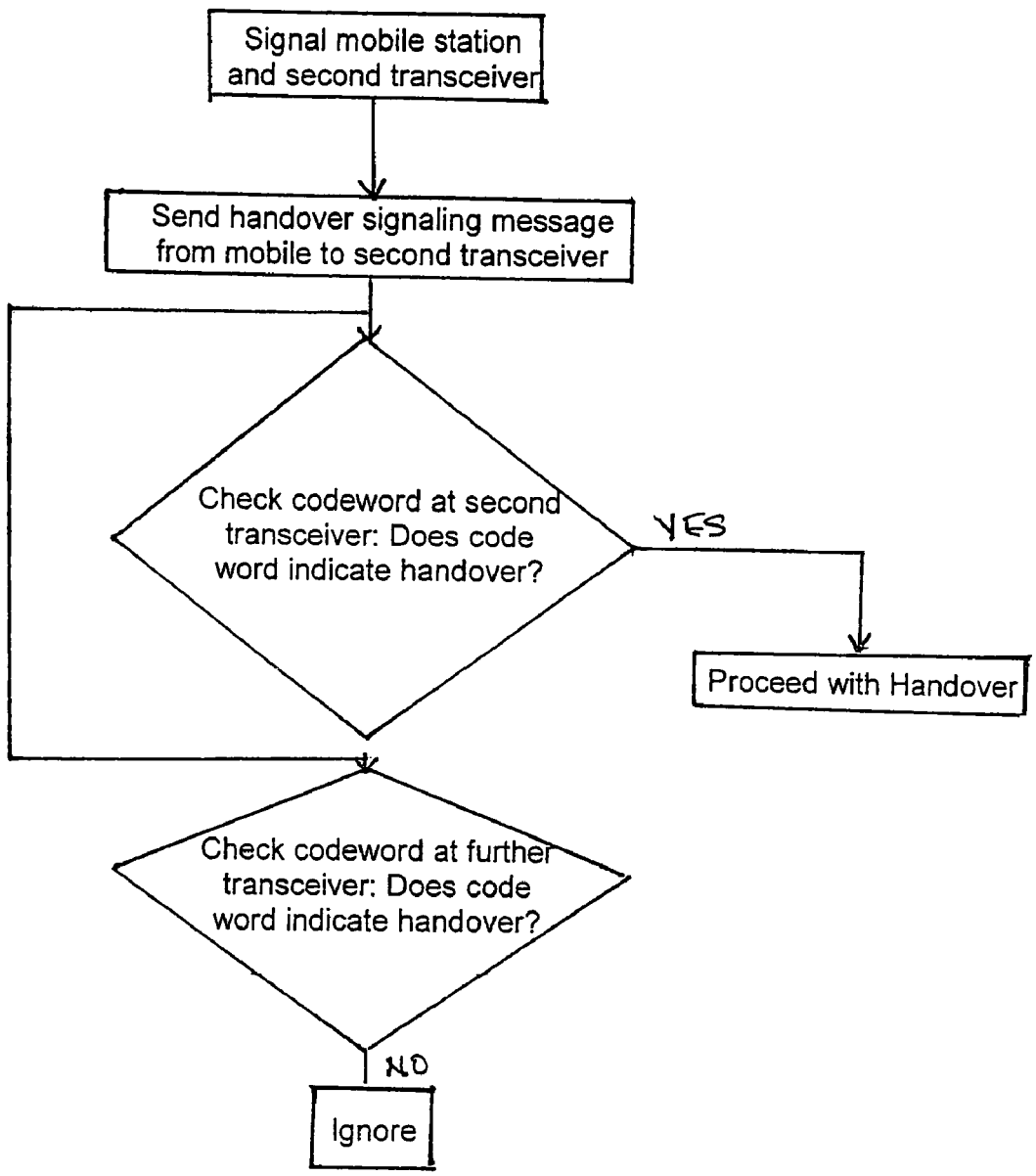
FIG. 2 is a flowchart of a method according to one possible embodiment of the invention.

Reference will now be made in detail to the preferred embodiments of the present invention, examples of which are illustrated in the accompanying drawings, wherein like reference numerals refer to like elements throughout.

A large number of hexagonal cells Zim, each having a base station BTSim, are provided in a cellular radio communications system. Each of the cells Zim is in this case assigned a broadcast radio channel BCCH at a frequency Fi, where i=0,1,2 . . . 6. To provide a further distinguishing feature between the cells Zim, each of them is allocated a base station color code (BCC), with an associated value m, where m=0,1,2 . . . 5.

If the radio communications system identifies that the conditions for carrying out a handover procedure are satisfied for a connection between a mobile station MS and the base station BTS03, since the mobile station MS has moved from the cell Z03 to the cell Z33, then the mobile station MS receives from the radio communications system the command to carry out the handover procedure from the base station BTS03 to the base station BTS33, in which the mobile station MS is assigned a traffic channel at a frequency F1. The mobile station then uses the frequency F1 to send a handover signaling message, which contains the base station color code BCC=3, to the base station BTS33, and the handover procedure identifier, which has a handover code. The handover signaling message can be received by all the cells to which the physical channel at the frequency F1 is assigned. In particular, the cells Z1m to which the physical channel at the frequency F1 is assigned as a broadcast radio channel (BCCH) can receive the handover signaling message. The base station BTS13, to which the physical channel at the frequency F1 is assigned as a broadcast radio channel BCCH and to which the base station color code BCC=3 is assigned, receives the handover signaling message and checks whether the code word matches the handover code, which is stored in the base station. Since this is the case, the base station BTS13 identifies that the code word is a handover procedure identifier and that the received signaling message is a handover signaling message, which it must ignore. The handover signaling message is thus rejected in the base station BTS13.

The base station BTS33, to which the radio link with the mobile station MS is intended to be switched, receives the handover procedure identifier which was transmitted by the radio communications system. It thus continues the handover procedure after receiving the handover signaling message from the mobile station MS.

Specific values are reserved for the handover code in the radio communications system. Although the format of the code word corresponds to the format of the code word in signaling messages by which a channel request to set up a connection is started, the value of the handover code is, however, not used for the code word for setting up a connection. The allocation of the handover code to handover signaling messages is thus unique.

The invention has been described in detail with particular reference to preferred embodiments thereof and examples, but it will be understood that variations and modifications can be effected within the spirit and scope of the invention.

What is claimed is:

1. A handover method for a radio communications system having first, second and further transceiver units, comprising:

signaling a mobile station and the second transceiver unit from the radio communications system to indicate that a handover is to occur;

sending a handover signaling message from the mobile station to the second transceiver unit in order to set up a connection to the second transceiver unit, the handover signaling message being sent via a channel that carries signaling messages for requesting a radio link, the handover signaling message containing a code word differentiating the handover signaling message from signaling messages for requesting a radio link;

checking the code word at the second transceiver unit and at one of the further transceiver units, which receives the handover signaling message on the same frequency as the second transceiver unit, to determine whether a handover signaling message or a signaling message for requesting a radio link has been received;

identifying the received signaling message at the one of the further transceiver stations as a handover signaling message on the basis of the code word;

ignoring, on the basis of the identification of the received message by the one of the further transceiver units, the handover signaling message; and proceeding with the handover at the second transceiver unit based on the code word and the signaling from the radio communications system.

2. The method as claimed in claim 1, wherein the handover code is stored in each of the transceiver units, the value of the code word received with a signaling message is compared with the handover code stored in each of the further transceiver units, if the value of the code word matches the handover code, the signaling message is identified as a handover signaling message.

3. The method as claimed in claim 2, wherein the handover code comprises a number of values, the value of a code word received with a signaling message is compared to the values of the handover code, and if the value of the code word matches one of the values of the handover code, the signaling message is identified as a handover signaling message.

4. The method as claimed in claim 3, wherein the mobile station receives from the radio communications system a command to initiate the handover procedure, which command contains information about the second transceiver unit and identifies the handover procedure, the radio communications system transmits information about the handover procedure to the second transceiver unit, and further transceiver units which receive the handover signaling message from the mobile station check whether the code word contained therein has a value matching the handover code and, if the value matches the handover code, the further transceiver units reject the handover signaling message.

5. The method as claimed in claim 4, wherein at least one of the transceiver units is a base station.

6. The method as claimed in claim 1, wherein the handover code comprises a number of values, the value of a code word received with a signaling message is compared to the values of the handover code, and if the value of the code word matches one of the values of the handover code, the signaling message is identified as a handover signaling message.

7. The method as claimed in claim 6, wherein the mobile station receives from the radio communications system a command to initiate the handover procedure, which command contains information about the second transceiver unit and identifies the handover procedure, the radio communications system transmits information about the handover procedure to the second transceiver unit, and further transceiver units which receive the handover signaling message from the mobile station check whether the code word contained therein has a value matching the handover code and, if the value matches the handover code, the further transceiver units reject the handover signaling message.

8. The method as claimed in claim 1, wherein at least one of the transceiver units is a base station.

9. A handover method for a radio communications system having first, second and further transceiver units, comprising:

signaling a mobile station and the second transceiver unit from the radio communications system to indicate that a handover is to occur;

sending a handover signaling message from the mobile station to the second transceiver unit in order to set up a connection to the second transceiver unit, the handover signaling message being sent via a channel, which also carries signaling messages for requesting a radio link, the handover signaling message containing a code word differentiating the handover signaling message from signaling messages for requesting a radio link;

checking the code word at one of the further transceiver units, which receives the handover signaling message on the same freguency as the second transceiver unit, to determine whether a handover signaling message or a signaling message for requesting a radio link has been received;

identifying the signaling message at the one of the further transceiver stations as a handover signaling message on the basis of the code word; and proceeding with the handover at the second transceiver unit based on the code word and signaling from the radio communications system.

* * * * *